T. LOWE.
GREASE CUP.
APPLICATION FILED APR. 29, 1911.
1,039,980.
Patented Oct. 1, 1912.
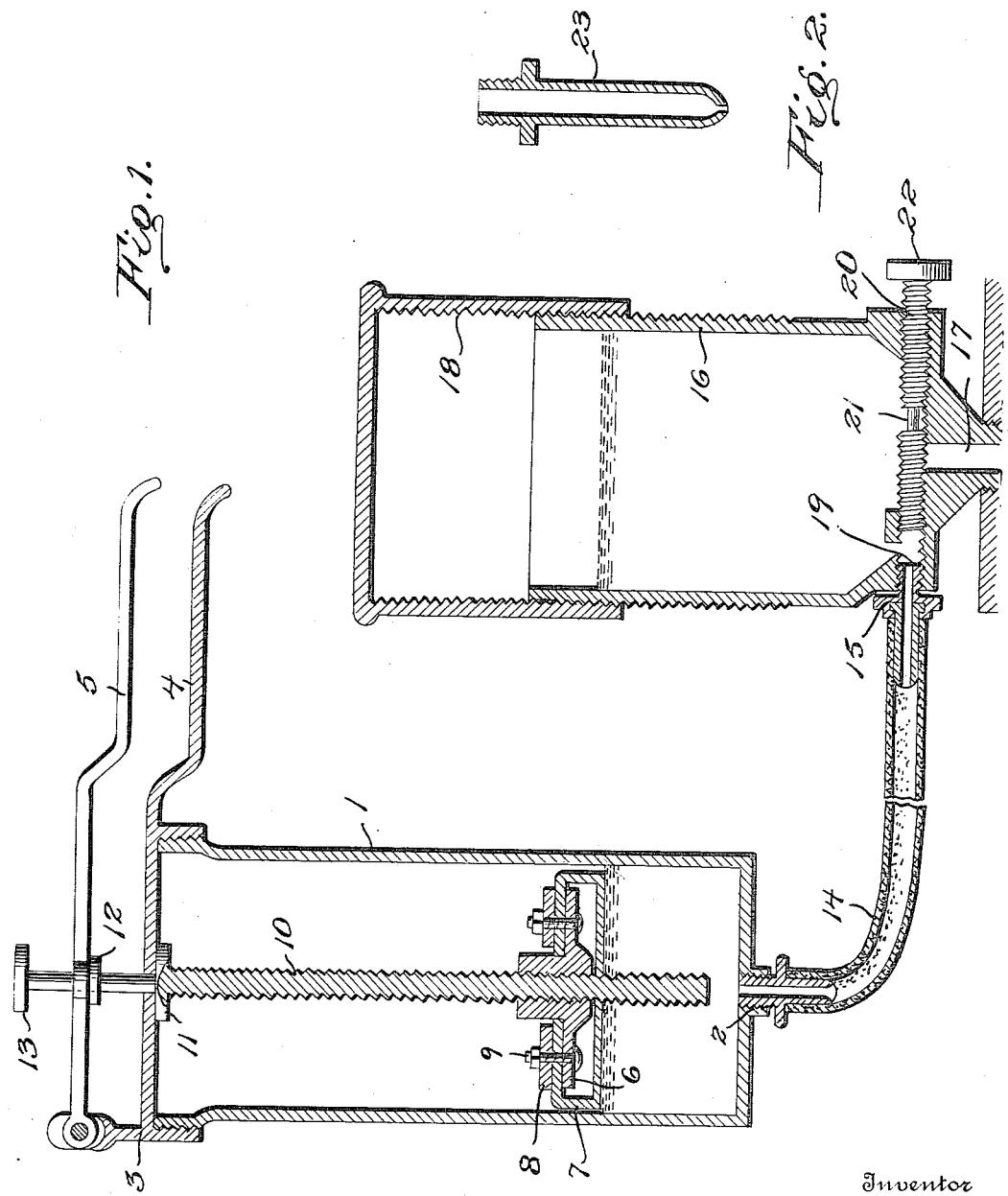

ly so that the hole 19 is opened 80
UNITED STATES PATENT OFFICE.

THOMAS LOWE, OF GARFIELD, WASHINGTON.

GREASE-CUP.

1,039,980.  Specification of Letters Patent.  Patented Oct. 1, 1912.

Application filed April 29, 1911. Serial No. 624,184.

*To all whom it may concern:*

Be it known that I, THOMAS LOWE, citizen of the United States, residing at Garfield, in the county of Whitman and State of Washington, have invented certain new and useful Improvements in Grease-Cups, of which the following is a specification.

This invention has relation to grease cups, and has for its object to provide a cup of simple structure adapted to be applied to a supporting member and which may be easily and quickly recharged with grease without removing the same from its support.

For a full understanding of the invention reference is to be had to the following description and accompanying drawings, in which:—

Figure 1 is a vertical sectional view of a filler attached to the cup; Fig. 2 is a sectional view of a nipple which may be used in conjunction with the filler.

Corresponding and like parts are referred to in the following description and indicated in all the views of the accompanying drawings by the same reference characters.

As illustrated in the accompanying drawing, the cup filler consists of a cylinder 1 having at its lower end a discharge outlet 2. A cap 3 is screwed upon the upper end of the cylinder 1 and is provided with a fixed handle 4. A handle lever 5 is pivoted upon the cap 3 and is arranged to swing in a plane toward and away from the handle 4. A plunger 7 is slidably mounted in the cylinder 1 and includes rings 6 and 8 through which securing bolts pass. A plunger rod 10 is screw threaded through the plunger ring 6 and is provided at its upper portion with a shoulder 11 which at times is adapted to engage the under surface of the cap 3. The upper portion of the rod 10 passes through the said cap and also passes through an opening provided in the handle lever 5. A stop shoulder 12 is mounted upon the rod 10 just below the handle lever 5 and at its upper end the rod 10 is provided with a turning knob 13. A tube 14 is connected at one end with the discharge outlet 2 of the cylinder 1 and may be provided with a union 15 which may be connected with the oil inlet of an oil cup such as will now be explained.

The oil cup consists of a cylindrical body 16 having a discharge nipple 17 which is adapted to be screwed into an oil hole or fitting of the journal bearing to be lubricated. A cap 18 is screwed upon the body 16. The body 16 is provided in the vicinity of its lower end with an oil inlet opening 19. A screw valve 20 is arranged to alternately open and close the oil inlet hole 19 and the passage way through the nipple 17. The said valve is provided with an intermediate reduced portion 21 and one end of the valve projects through the side of the body 16 and is provided with a knob 22. The valve 20 is in axial alinement with the oil hole 19 and when the valve is moved longitudinally so that it closes the oil hole 19, the reduced portion 21 of the valve is located over the upper end of the passageway through the nipple 17 and consequently the said nipple is opened. The reduced portion 21 is moved from over the passageway through the nipple 17 and a portion of the valve of major diameter moves over the said passageway and closes the same.

In operation when it is desired to fill the body 16 of the oil cup, the valve 20 is moved longitudinally so that the hole 19 is opened and the passageway through the nipple 17 is closed. The cap 18 is then screwed down so that its top is against the upper edge of the body 16. The cap 3 is then removed from the cylinder 1 together with the piston 7 and the said cylinder is filled with hard oil lubricant. The union 15 is then connected with the hole 19 in the body 16 and the plunger 7 is replaced in the cylinder 1 over the hard oil and the cap 3 is screwed in position upon the said cylinder. An operator then swings the handle lever 5 toward the handle 4 and when the said lever comes in contact with the shoulder 12 of the piston rod 10 the said piston rod is moved down, carrying with it the piston 7 toward the discharge outlet 2. Thus the hard oil lubricant is forced out of the cylinder 1 through the outlet 2, thence through the tube 14 and coupling 15 into the body 16 under the cap 18. As the said body 16 fills the cap 18 is gradually unscrewed so that its top is moved away from the upper edge of the body 16. Then the forcing operation from the cylinder 1 is repeated so that the oil cup is replenished with the hard lubricant. After the oil cup has been completely filled the valve 20 is moved longitudinally so that its end portion closes the hole 19 and its reduced portion 21 is over the passageway through the nipple 17. The coupling 15 is then disconnected from the hole 19. The cap 18 is then screwed down so that the oil contained in the body 16 is subjected to a pressure which will force the same through the passageway in the nipple 17 into the journaled bearing. As the lubricant is consumed the cap 18 is screwed down by degrees until its top comes in contact with the upper end of the body 16, at which time the cup is in condition for refilling.

In lieu of using a union 15 as above described, in some instances the tube 14 may be provided with a discharge nozzle 23. When this nozzle is used it is held or pressed in close contact with the outer end of the hole 19 in the cup 16 and the forcing operation of the oil as above described is performed.

Having thus described the invention, what is claimed as new is:—

A cup, comprising a body having an inlet opening and an outlet opening, said openings entering the body of the cup at angles to each other, a valve threaded in the lower portion of the cup and adapted to move across the bottom of the same and being in alinement with the inlet opening, and lying transversely across the outlet opening, said valve consisting of end portions of uniform diameter and a reduced portion intermediate said end portions.

In testimony whereof, I affix my signature in presence of two witnesses.

THOMAS LOWE. [L. S.]

Witnesses:
 J. E. GILL,
 W. R. COUCH.